Patented Aug. 13, 1940

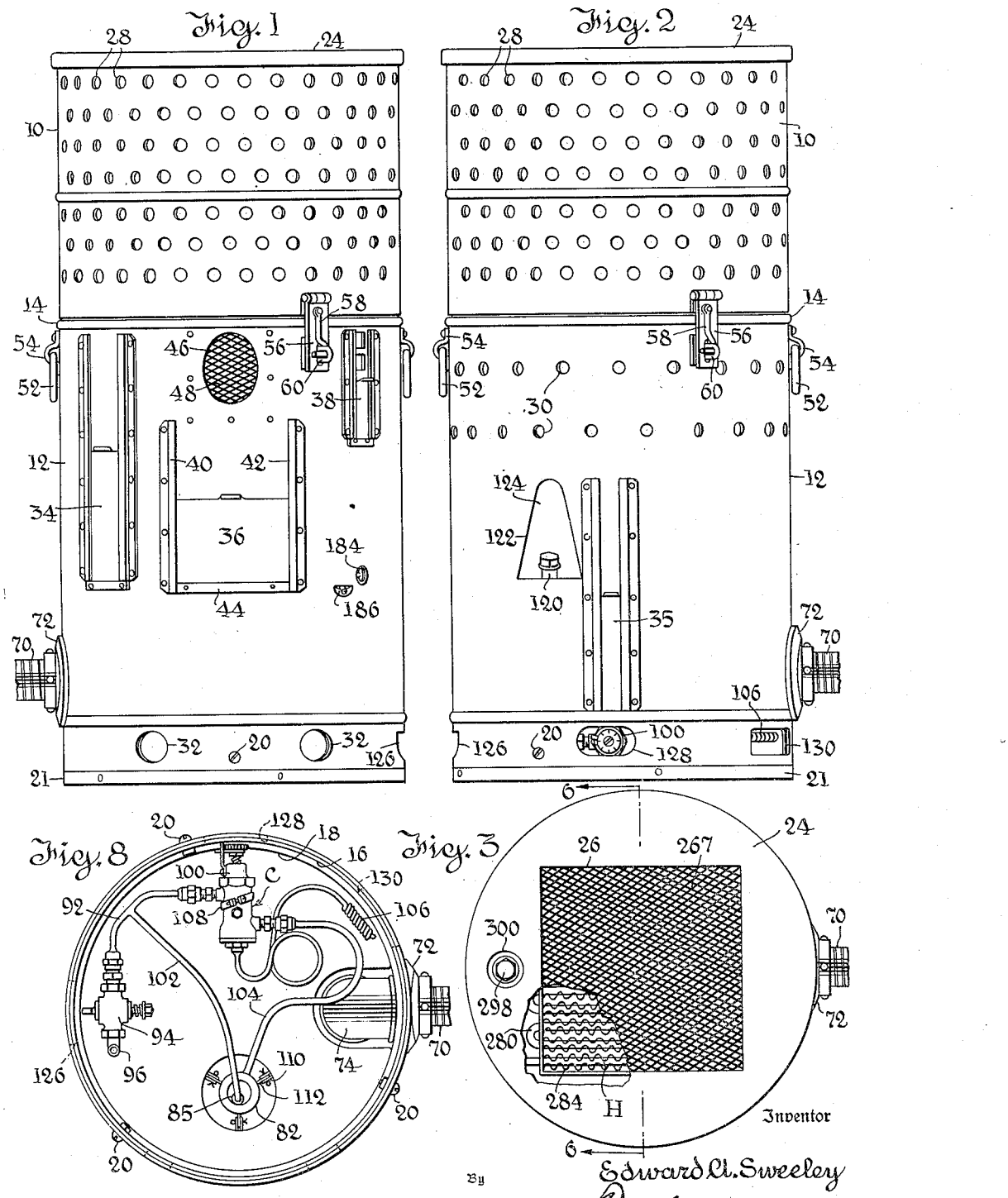

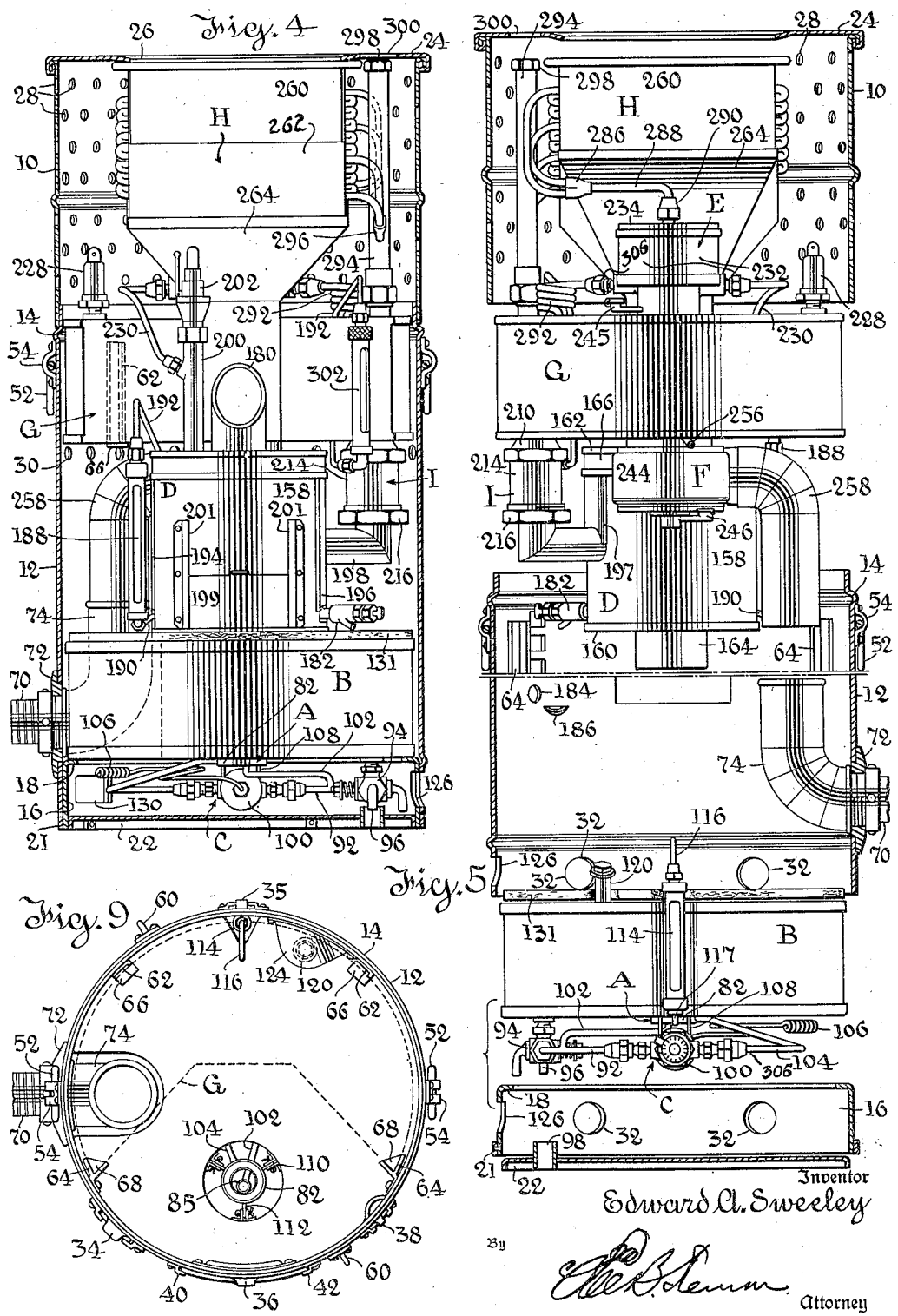

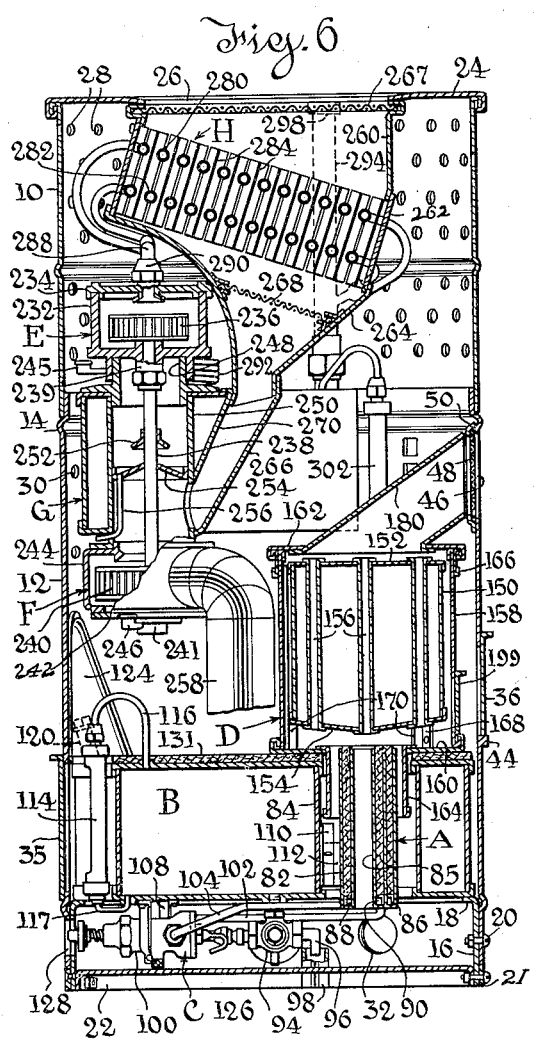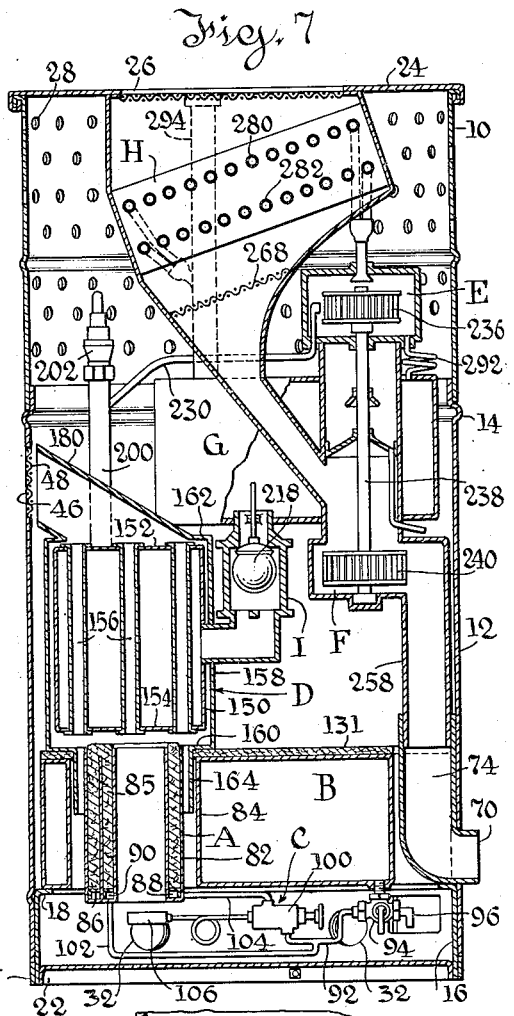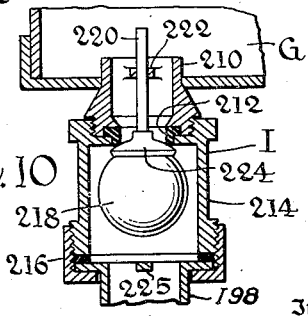

2,211,631

UNITED STATES PATENT OFFICE 2,211,631

HEATING APPARATUS

Edward A. Sweeley, Alexandria, Va., assignor to Fruit Growers Express Company, a corporation of Delaware Application December 14, 1938, Serial No. 245,771

24 Claims. (Cl. 237—17)

This invention relates to heating apparatus, and more particularly to heating apparatus for use in heating storage chambers to protect stored or transportation loads of fruits and other perishable commodities against injury or damage due to freezing or undesired low temperatures.

While the heating system of this invention is especially suited to the heating requirements of railway refrigerator cars, it is obviously adapted for other uses and purposes and may be employed for heating cars, trucks, ships and storage houses generally.

The present heating apparatus is of the general type shown in the Sweeley and Killingstad Patent No. 2,065,251, issued December 22, 1936. Reference may, therefore, be made to that prior patent for an explanation of the use of the present heating apparatus in railway refrigerator cars and for other purposes.

The heating apparatus of the present invention serves substantially all the functions, and has many of the features, of the heating apparatus disclosed in said prior patent. The heating apparatus of the present disclosure, has, in addition, a number of other features, which are novel and contribute to its merit.

The heating apparatus of this invention, in its preferred form, is portable and so constructed that its parts are readily accessible for cleaning, inspection and repair. The various parts of this heating apparatus, in its preferred form, are furthermore so constructed that they may be assembled, replaced, or removed in a relatively simple and convenient manner by an attendant.

The heating apparatus of this invention is also characterized by its efficiency and dependability during operation over relatively long periods of time.

The heating apparatus of this invention, in its preferred form, is also characterized by its self-sufficiency for continued, automatic operation in accordance with the temperature conditions of the merchandise or other chamber within which the apparatus is operating. The heating apparatus will function automatically and in desired manner for relatively long periods of time, without requiring inspection or other attention of service men.

It is, therefore, an object of this invention to provide a heating apparatus which is novel and efficient.

Another object is to provide a heating apparatus which is relatively simple and inexpensive to manufacture, operate, inspect and repair.

A further object is to provide a self-contained heating apparatus which generates steam for heating purposes and for supplying the energy to drive a draft producing means, and which will operate for relatively long periods of time without requiring renewal of its water supply.

Another object is to provide a portable heating apparatus which generates steam to heat air passing through the apparatus and which provides rapid condensation of such steam and its return to the water supply of the apparatus.

Another object is to provide a portable heating apparatus having two separate paths for air passing through the apparatus. One of these paths is for the air to be heated by the apparatus. The other path is for air to cool certain elements of the apparatus, which otherwise might reach a higher temperature than that desired.

Another object is to provide portable heating apparatus having a fuel burner, a heat exchange means, and separate paths through the apparatus for the products of combustion coming from the fuel burner and for the air to be heated by said heat exchange means.

A still further object is to provide portable heating apparatus in which provision is made for maintaining certain elements thereof in a comparatively cool state for their more efficient operation.

Another object is to provide a novel construction for the housing of a portable heating apparatus.

Other objects and advantages will be apparent from the accompanying drawings illustrating a preferred embodiment of this invention, the appended claims, and the following detailed description of the apparatus illustrated in the accompanying drawings.

Referring to the accompanying drawings, Figures 1 and 2 are front and rear elevational views respectively of heating apparatus embodying this invention.

Figure 3 is a top view of the heating apparatus shown in Figures 1 and 2, part of the top being broken away for purposes of illustration.

Figure 4 is an elevational view of the interior of the heating apparatus shown in Figure 1, the casing of the heating apparatus being shown in Figure 4 in vertical cross-section for purposes of illustration.

Figure 5 is an exploded view of the apparatus shown in Figures 1 to 4 and illustrates the method of assembly of the heating apparatus. The Figure 5 view is taken from the rear of the heating apparatus (looking at Figure 4) and shows the two assembly units of this apparatus in elevation.

Figure 6 is a vertical cross-sectional view taken on line 6—6 of Figure 3.

Figure 7 is a more or less diagrammatic view of the heating apparatus shown in the other figures and shows the paths for the water, steam and fuel of the apparatus during their circulation.

Figure 8 is a bottom view of the heating apparatus shown in Figures 1 and 2, with the bottom tray removed.

Figure 9 is a top view of the heating apparatus with the cover member and the air heating and circulating assembly unit removed from the apparatus.

Figure 10 is a vertical, cross-sectional view of a detail of the present heating apparatus.

*Casing*

Referring now to the drawings, and particularly to Figures 1 and 2, the heating apparatus of this invention is provided with a casing which houses the working parts of the apparatus. The casing is preferably formed of sheet metal, although other suitable material may be used, if desired. The casing includes upper and lower cylindrical jacket members 10 and 12. The upper jacket member 10 has a sliding fit with the lower jacket member 12, and, when in place, rests on an annular rib 14 which is formed in the lower jacket member 12. A base ring 16 (see Figs. 2, 5 and 6) is received within and detachably secured to the lower end of the jacket member 12. This base ring 16 has an inwardly extending annular flange 18 (see Fig. 6) at its upper end and may be secured to the jacket member 12 as by means of nuts and bolts 20 (see Figs. 1 and 6). In order to provide for the proper placement of the base ring 16 within the jacket member 12, the former may be provided with a band 21 to abut the lower edge of the jacket member 12. The bottom wall of the casing is formed by a flanged tray or plate 22 (see Figs. 4 and 6). This tray 22 may be removably secured to and within the base ring 16 in any suitable manner. The top of the casing is formed by member 24 which is secured, by crimping or in other suitable manner, to the upper edge of the jacket member 10. This top member 24 is provided with an opening 26 (see Figs. 3 and 6), which may be of any suitable size and shape, and which is provided for a purpose to be described hereinafter.

The cylindrical jacket members 10 and 12 are so constructed as to allow circulation of air into and out of the casing. For this purpose, the jacket member 10 is provided with a number of rows of apertures 28, and the shell member 12 is provided with a number of rows of apertures 30. The same purpose is served by the openings 32 which extend through both the jacket member 12 and the base ring 16.

Certain of the apparatus parts which are arranged within the casing and described hereinafter, may be inspected by raising the slides or doors 34, 35, 36 and 38 (see Figs. 1 and 2) which are similarly supported on the exterior of the jacket member 12. Each of these doors 34, 35, 36 and 38, in the positions illustrated by Figs. 1 and 2, covers an opening in jacket member 12. Each of these doors (see, for example, door 35) is slidably received in a set of two guides 40, 42. These guides 40 and 42 permit their door to be raised in a sliding movement, in order to expose the opening which it normally covers. The downward movement of each door (34, 35, 36 and 38) is limited by a stop 44. The guides 40 and 42 and the stops 44 may be secured to the jacket member 12 by riveting, or in any other suitable manner.

The jacket member 12 is also provided with an exhaust opening 46 (see Fig. 1), over which may extend a grille 48 of expanded metal. This grille work 48 may be held in place at the opening 46 by means of a frame 50 (see Fig. 6), which is riveted or otherwise secured to the jacket member 12.

The heating apparatus of this invention, in its preferred form as illustrated in the accompanying drawings, is portable and may be conveniently carried by hand. In order to facilitate handling of the heating apparatus, it is preferably provided with handles 52 at opposite sides of the casing. These handles 52 are mounted in supports 54 which are riveted or otherwise secured to the jacket member 12.

If desired, means may be provided for holding the casing cover or closure (formed by jacket member 10 and the top member 24) in place during use of the heating apparatus or during its transportation. The apparatus, for example, may be provided with two latch devices as shown in Figures 1 and 2. Each of these latch devices comprises a slotted plate 56 having hinge connection with jacket member 10 and pivotally supporting the latch hook 58. A staple 60 is suitably mounted on the jacket member 12 and is adapted to extend through the slot in the associated plate 56 for engagement with its latch hook 58.

The support for the air heating and circulating assembly unit of the apparatus is provided by brackets 62 and 64 (see Figs. 4 and 9) which are secured to the interior wall of the jacket member 12. These brackets 62 and 64 are provided with horizontal flanges 66 and 68 respectively at their lower ends.

An exhaust for air heated by the apparatus is provided by pipe 70 (see Figs. 1 and 4) having connection with the jacket member 12 at an opening therein adjacent the base of the casing. This pipe 70 may be of flexible construction, may be extensible, or may be of any other desired construction. The pipe 70 may be removably secured in place by having threaded engagement with a fitting 72 which is secured in suitable manner to the jacket member 12 (see Fig. 4). A pipe elbow 74, which is also secured to the jacket member 12, has its lower end opening into the pipe 70.

*Assembly units*

This invention is a preferred form provides two assemblies which are separately removable as units from the apparatus casing described above. One of these unit assemblies (see Fig. 5) comprises a fuel reservoir B, a fuel burner A, and a fuel supply regulator or thermostat control device C. This assembly may be termed the fuel supply and burner assembly.

The other assembly unit, which is shown in the upper part of Figure 5, may be called, for convenience, the air heating and circulating assembly. This assembly unit comprises a boiler D, a turbine E, a blower F, a condenser H, a water reservoir G, and a boiler feed water valve device I.

*Fuel supply and burner assembly unit*

The heating apparatus of this invention is self-sufficient for continued operation over relatively long periods of time without requiring attention. In securing such end, this invention provides a relatively large fuel reservoir B. The fuel reservoir B preferably conforms in general to the shape of the casing interior and has a pipe 84 extending between its upper and lower walls to provide space for the burner A (see Fig. 6). The support for the fuel reservoir B is provided by the flange 18, on which it rests.

The burner A includes a main burner 82 of cylindrical form and a pilot burner 85. The main burner 82 may have a wick of asbestos or other suitable material. This wick is preferably supported by an apertured ring member 86 (see Fig. 6) which so spaces the wick from the bottom of the wick-holder as to leave an annular fuel well 88. The pilot 85 preferably comprises a stainless steel tube and an asbestos wick, the latter being so supported as to leave a well 90.

The supply of fuel from reservoir B to burner A may be controlled and regulated by any suitable conventional regulator or control device C. As shown by Figures 6, 7 and 8, the reservoir B may be connected to a pipe line 92 having a three-way valve device 94. This valve device 94, in one position of adjustment, provides for draining of the reservoir B through outlet 96 (see Figs. 4 and 6) which leads into a pipe section 98 that extends through the tray 22. In another or the closed position of adjustment of the valve device 94, the flow of fuel from reservoir B is shut off completely. The valve device 94 is also operable to a position for opening the pipe line 92 to supply fuel to the pilot 85 and the thermostatic device 100. The pipe 102 is connected to the pipe line 92 so as to by-pass part of the fuel supply around the thermostatic device 100 and to provide a continuous feed of fuel for the pilot 85 during operation of the heating apparatus. Fuel passing through the thermostatic device 100 is fed by pipe 104 to the main burner 82 (see Fig. 8). The thermostatic device 100 is controlled by a thermostat 106 which is responsive to ambient temperatures adjacent the base of the heating apparatus. The function of the thermostat 106 and the thermostatic device 100 is to automatically regulate the supply of fuel to burner 82, so that the heating apparatus will operate to maintain the temperature of the air in the merchandise chamber, in which the apparatus is located, substantially uniform over relatively long periods of time. The thermostatic device 100 may be held in place by means of a removable strap 108 (see Figs. 6 and 8) which is detachably secured to the bottom wall of the fuel reservoir B.

The burner A is supported from the reservoir B. The burner support includes apertured brackets 110 (see Figs. 6 and 9) which are mounted in the pipe 84 forming a wall of the reservoir. Apertured lugs 112 on the outer wall of burner A are secured, for example, by means of cotter pins, to the brackets 110. The fuel burner A may, therefore, be readily detached from the fuel reservoir B by simply removing the cotter pins which secure the burner lugs 112 to brackets 110.

The liquid level of the fuel reservoir B is indicated by a gauge 114 which is connected by tubing 116 and 117 (see Fig. 6) with the upper and lower portions of the fuel reservoir B. The reservoir B is suitably shaped to provide a space for the gauge 114 between the same and the inner wall of the casing, as will be seen from Figures 6 and 9. The gauge 114 is arranged adjacent the door 35 (see Figs. 2 and 6), so that when the latter is raised the fuel level may be read through the uncovered opening. It will also be noted that the reservoir B, in the preferred form illustrated by the drawings, provides the sole support for the burner A, the entire fuel supply system, and the fuel gauge 114.

Fuel is introduced into the reservoir B by way of a filler pipe 120 which is accessible through opening 122 in the jacket member 12. This filler pipe 120 is protected against accidental damage as it is located within the limits of the heater casing and is covered by a shield 124, which is mounted at opening 122.

The fuel reservoir B is also suitably shaped to provide space for the pipe elbow 74 (see Figs. 7 and 9), in order that the latter will not interfere with the assembly and removability of the reservoir B through the lower end of the casing.

If the fuel supply and burner assembly unit is to be removed from the casing for any desired purpose, the ring 16 is first removed from the base of the casing. The complete assembly of the fuel burner A, the fuel reservoir B, the fuel supply or control system C, and the fuel gauge 114 may then be removed as a unit through the lower end of the casing or jacket member 12 (see particularly Fig. 5.)

An opening 126 which extends through both the jacket member 12 and the base ring 16 permits access to the valve device 94 (see Fig. 4), so that the latter may be manually adjusted as desired. The thermostat device 100 is accessible through an opening 128 which also extends through the jacket member 12 and the base ring 16. An opening 130 is positioned adjacent the thermometer 106 (see Figs. 2, 4 and 8), so that the latter will be in the path of air entering the apparatus at its base.

Each of the openings 32, 126, 128, and 130 allows air to circulate into the interior of the heater casing. The heating apparatus is automatically controlled in accordance with the temperature of this incoming air. This air also ascends within the casing, part of the air passing upwardly in the pipe 84 (see Fig. 6) and supplying the needs of the burner A. The ascending air also contacts the bottom and side walls of the fuel reservoir B and thereby tends to maintain the fuel at a relatively low temperature. A removable asbestos mat or pad 131, extending across the top wall of the fuel reservoir B, insulates the latter against the heat in the upper part of the casing.

*Air heating and circulating system*

The burner A supplies the heat for a boiler D. This boiler D is preferably formed of copper and comprises a cylindrical wall 150, top and bottom walls 152 and 154, and boiler flues 156. The boiler D is housed within a jacket comprising a cylindrical wall 158, a bottom wall 160, and a top wall 162. This boiler jacket may be formed, for example, of galvanized iron. The bottom wall 160 has a central opening, in which is mounted a depending collar 164. This collar 164 has a sliding fit within the pipe 84. The boiler jacket top wall 162 is removable from the jacket wall 158 and carries a depending ring 166 which has a sliding fit with the boiler jacket wall 158. The boiler D is slidably received within its jacket so that the former may be removed when the boiler jacket top wall 162 is lifted off jacket wall 158. This support is provided by a number of boiler guides 168 (see Fig. 6). These guides 168 are riveted or otherwise secured to the boiler jacket wall 158, space the boiler D from jacket wall 158, and have projections 170 at their lower ends, on which rest the bottom wall 154 of the boiler D. The boiler jacket top wall 162 also supports a flue pipe 180 in such position that its outer end is adjacent and in register with the grille 48 that is supported on the casing jacket member 12. The flue pipe 180, as shown in the drawings, is preferably not connected to the casing and, therefore, does not interfere with removal of the air heating and circulating assembly unit from the casing.

The boiler D is also provided with a drain valve 182 (see Fig. 4) which may be operated through an opening 184 (see Fig. 1) in the casing jacket member 12. The jacket member 12 also has an opening 186 (see Fig. 1), through which the water is discharged when the valve 182 is opened to drain the boiler D.

The liquid level of the water in boiler D is indicated by a gauge 188 (see Fig. 4) which may be of any conventional form or construction. This gauge 188 is adjacent door 34 (see Fig. 1) and may be viewed by raising the latter. The lower end of the boiler gauge 188 is connected by tubing 190 (see Fig. 4) with the lower end of the boiler D. The upper end of the gauge 188 is connected with the upper end of the boiler D by means of tubing 192, which extends through the boiler jacket top wall 162. The boiler jacket wall 158 is provided with slides 194, 196 and 197 (see Figs. 4 and 5) which are arranged within correspondingly-shaped slots in the boiler jacket wall 158. In order to remove the boiler D from its jacket, the jacket top 162, is first removed, and then the slides 194, 196 and 197 are removed by sliding movement toward the upper end of the boiler jacket. The boiler D may then be lifted out of its jacket without necessitating the removal or disconnection of the drain valve 182, the gauge 188, and the boiler water feed pipe 198.

The steam produced in boiler D is discharged into a pipe 200, at the top of which is mounted a boiler safety valve 202 (see Fig. 4) of conventional design. Both the steam pipe 200 and the gauge tubing 192 extend through the boiler jacket top wall 162. The latter, therefore, may have a removable section (not shown) to fit about the tubing 192 and the steam pipe 200. Removal of this top wall section facilitates removal of the top jacket wall 162, when the boiler D is to be inspected.

The boiler jacket wall 158 also has a fire door 199 slidably mounted in guides 201 (see Fig. 4). The fire door 199 is adjacent casing door 36 (see Figs. 1 and 6), so that both doors may be conveniently raised to provide access to the interior of the boiler jacket for the purpose of lighting the burner pilot 85.

The water for boiler D is supplied by a reservoir G, the shape of which is shown in outline by dotted lines in Figure 9. It will be noted that the outer wall of the reservoir G is arcuately shaped, has an external diameter somewhat smaller than the internal diameter of the casing jacket member 12, conforms in general to the curvature of the casing wall, and is spaced somewhat from the casing side wall by the bracket members 62 and 64. The reservoir G is also preferably formed of copper although any suitable material may be used in its construction. The water reservoir G is provided with a safety valve 228, which may be of conventional construction. This safety valve 228 automatically relieves the reservoir G of any undesired high pressures which may occur during operation of the heating apparatus. The reservoir G is supported in place in the casing by the horizontal flanges 66 and 68 (see Fig. 9) of the brackets 62 and 64. The inwardly and vertically extending flanges of the brackets 64 (as shown by Fig. 9) also serve as guides for the ends of the reservoir G, so that the flue pipe 180 will be properly positioned relative to the grille 48, and the jacket collar 164 will be properly positioned in the fuel reservoir pipe 84.

The supply of water from reservoir G to the boiler D is controlled by a feed water valve device I (see Figs. 4, 5 and 10). This valve device includes a fitting 210 that is connected to the bottom wall of the reservoir G, a valve seat 212 of rubber, a valve body member 214, a valve nut 216 and the pipe connection 198 which leads to the boiler D. A hollow ball or float valve 218 is arranged in the valve body member 214. The valve 218 is secured to and guided in its movements by a rod 220. This rod 220 is slidably disposed in a guide 222 which is supported at its opposite ends by the fitting 210. The valve 218 also has an annular washer 224, of brass or other suitable material, for engagement with the valve seat 212. The valve 218 is automatically and intermittently operated to allow water to flow from the reservoir G to the boiler D. In its opening operation, the valve 218 has its movement limited by the stop pin 225. In its closed position which is illustrated in Fig. 10, the valve 218 is pressed tightly against the valve seat 212 to interrupt the flow of water from reservoir G to boiler D. The valve device I is preferably arranged at substantially the level of the upper wall 152 of the boiler D. With this arrangement, the water level in valve body member 214 will rise to assist in closing the valve 218, as the boiler D becomes substantially filled with water.

It will now be clear that the valve 218 is subjected to two opposing forces. One of these forces acts on the valve 218 in a direction to force it to its closed position. This force results from the pressure of the steam in boiler D and/or the level of the water in valve body member 214. The other force acting on the valve 218 is the pressure resulting from both the weight of the water and the steam pressure, if any, in reservoir G. Whenever the liquid level in boiler D is low and the boiler steam pressure falls below the value of the force acting in the reverse direction on the valve 218, the latter moves away from the valve seat 212 to allow the water in reservoir G to flow to the boiler D. As soon as the force tending to seat the valve 218 reaches the value in which it overcomes the reverse force acting on valve 218, the latter will be operated to its closed position.

Tubing 230 (see Figs. 4 and 7) is connected to the boiler pipe 200 and supplies the steam that is produced in the boiler D to a turbine E. This turbine E comprises a chamber or housing 232 having a removable cover or top 234, which preferably has threaded engagement with the turbine chamber cylindrical side wall. The steam being supplied by tubing 230 issues from a nozzle which is diagrammatically illustrated in Figure 7. This nozzle is so arranged within the turbine chamber that it will operate the turbine wheel 236. A screen of suitable form is preferably provided in the pipe 230 to filter out any impurities which might be present in the steam which is fed to the turbine E.

The turbine wheel 236 is secured to the upper end of a drive shaft 238, to which is also secured the blower fan 240 of the blower F. Any suitable metal may be used for the shaft 238, although Monel rust-resisting metal is preferable. The drive shaft 238 extends through and is rotatably mounted in a bearing 239 which is supported by the bottom wall of the turbine chamber (see Fig. 6). The lower end of shaft 238 is provided with a thrust bearing 241. This thrust bearing 241 is mounted in the removable bottom wall 242 of the blower housing 244. The bearing 239 is supplied with oil by the oil pipe and cup indicated at 245 in Figure 5, and the thrust bearing 241 is fed with oil by the pipe and cup indicated at 246.

The turbine chamber is supported on top of the reservoir G by means of a fitting 248. This fitting 248, together with the tube 250, provides a housing for the drive shaft 238 intermediate of the turbine E and blower F. The fitting 248 is secured to and extends through the top wall of the reservoir G. The tube 250 has water-tight connection with the upper and lower walls of the reservoir G, and is also connected with the fitting 248. A diverter 252 is secured to the drive shaft 238 for deflecting any condensation which may escape from the turbine bearing 239. The deflected condensation is collected by a shield 254 which is secured to the reservoir tube 250. The collected condensation is discharged through a drip tube 256.

The air circulated by blower F is discharged into a pipe connection 258, which has a sliding fit within the pipe 74 (see Figs. 4 and 7).

Air is supplied to the blower F through a duct or conduit that is formed of a number of sections 260, 262, 264 and 266 which may be detachably secured together as by means of screws. The uppermost section 260 has a grille 267 of expanded metal, which, when the apparatus is completely assembled, underlies and extends across the opening 26 in casing top 24 (see Figs. 3 and 6). The next section 262 serves as a support and frame for the condenser H. The section 264 is tapered toward its lower end and has a screen 268 extending across its interior. The air duct section 266, together with the water reservoir wall 270 (see Fig. 6), forms the lower end of the air inlet which leads into the tube 250 below the condensation shield 254. The lower end of the tube 250 communicates with the inlet of the blower housing 244.

The condenser H may be of conventional construction and may comprise upper and lower tubing 280 and 282, which are preferably arranged in planes that are parallel to each other but inclined to the horizontal so that their inlet ends will be disposed in an elevated position as shown in the drawings. Each tubing (280 and 282) is preferably formed from a single length of pipe and so shaped as to present, in effect, a number of pipe sections extending side by side and across the condenser frame 262 with the ends of the pipe sections so communicating with each other as to provide a continuous path for the steam to be condensed. The condenser H also includes a number of metallic fins 284 for the tubing 280 and 282. These fins 284 (shown in transverse cross-section in Fig. 6) are in the form of corrugated metallic strips which are so slotted that they fit onto the tubing 280 and 282. There are preferably two metallic fins 284 for each section of tubing as shown by Figure 3.

The tubing 280 and 282, at their inlet end, are connected by a Y-shaped pipe fitting 286 to one end of the tube 288. The other end of tube 288 is connected by a fitting 290 with the removable turbine chamber cover 234.

The steam introduced into the turbine E drives the turbine wheel 236. To provide for efficient operation of the turbine E, it is kept free of any substantial amount of condensation by a drain coil 292. As rapidly as condensate forms in the turbine housing 232, it is drained off by the coil 292 and returned by gravity action to the water reservoir G. For this purpose, the drain coil 292 is connected to the lower portion of the turbine housing 232 and to the top wall of the reservoir G. The steam which is not condensed in turbine chamber 232 passes through tube 288 and divides, at fitting 286, into two streams which pass through condenser tubing 280 and 282 respectively. The steam rapidly condenses in tubing 280 and 282, the resulting condensate being discharged into the water filler pipe 294 of the reservoir G. This return of condensate is by gravity action, which is facilitated by the inclination of the condenser H towards its outlet end (see Fig. 6). The connection between the outlet ends of the tubing 280 and 282 and the water filler pipe 294 is formed by a Y-fitting 296 (see Fig. 4).

The water filler piper 294 is of such length that its cap 298 is adjacent the top casing member 24 and is accessible through the opening 300 (see Figs. 3 and 4). The level of the water in reservoir G is indicated by the gauge 302, which is arranged adjacent the door 38.

*Operation*

If the heating apparatus is to be used in heating the merchandise chamber of a railway refrigerator car, it may be placed in either an end ice bunker or in the lading space itself as illustrated in Figures 1 and 2 of the above-mentioned prior Sweeley et al. Patent No. 2,065,251. The pipe 70 illustrated in the accompanying drawings may be connected to an air distributor, such as the manifold 22 and branches 23 or 26 of said prior patent. This air distributor would preferably be arranged to discharge the heated air in streams along the car floor and below the floor racks as in the prior patent. It will also be noted that the hot air exhaust pipe 70 extends from adjacent the base of the heating apparatus. With this arrangement, the pipe 70 will be on a level with the opening under the floor racks when the heating apparatus is arranged in a car end ice bunker.

Before the heating apparatus is operated, the liquid level gauges 114, 188 and 302 should be inspected to determine if the reservoirs B and G and the boiler D are adequately supplied with fluid. This inspection is permitted by the doors 35, 34, and 38 respectively. The thermostat device 100 should also be adjusted through opening 128 in accordance with the temperature conditions which it is desired should be maintained in the railway car merchandise chamber. The valve device 94 is also adjusted to establish communication between the fuel reservoir B and the thermostat device 100, and the pilot 85. The pilot 85 is now ignited, access to the same being permitted by the casing door 36 (see Figs. 1 and 6) and the fire door 199 (see Figs. 4 and 6). The pilot 85 serves to ignite the fuel of the main burner 82. The products of combustion from the burner A pass upwardly through the flues 156 and along the outer wall 150 of the boiler D. The products of combustion then pass through the flue 180 and are finally discharged through the grille 48 (see Fig. 6).

The steam produced by boiler D is fed by the pipe 200 and the tubing 230 to the turbine E.

This steam operates the turbine wheel 236, which provides the drive for the blower fan 240. The condensate collecting in the turbine E is returned to the water reservoir G by way of the coil 292. The steam in turbine E is fed by way of tube 288 to the higher end of the condenser H. The condensate forming in the condenser H flows by gravity action to its lower end and is returned to the water reservoir G by way of the water filler pipe 294. The water feed valve I, in the manner previously described, operates to maintain a sufficient supply of water in the boiler D during operation of the heating apparatus.

The blower fan 240 draws air into the apparatus through the grille 267 and downwardly in the conduit in which the condenser H is located. The large area of surface presented by the condenser H provides for rapid heating of the incoming air and also the rapid condensation of the steam within the condenser H. The heated air is then freed of any large particles which may be present by the screen 268 and is then drawn into the blower housing 244. The heated air is then discharged into the pipe 258 which leads into the pipe elbow 74. The heated air is discharged from the apparatus through the pipe 70.

The heat within the apparatus will also produce a natural draft of air upwardly in the apparatus casing. Some or all of this air may enter the apparatus casing through the openings 32, 126, 128 and 130. Part of this air will flow upwardly in the pipe 84, extending through the fuel reservoir B, to supply the needs of the burner A. The incoming air will also contact the thermometer 106 so that the latter will control the thermostat device 100 in accordance with the temperature conditions adjacent the floor of the merchandise chamber. The air rising from the base of the apparatus will also tend to cool or prevent overheating of the fuel reservoir B.

The air rising within the apparatus casing will also contact and tend to cool the walls of the water reservoir, the blower F, and the turbine E. This cooling action of the rising air will tend to maintain the reservoir G, the blower F and the turbine E at a relatively low temperature. The heating apparatus will, therefore, function in a more efficient manner than it would without such cooling action. The rising air within the casing may find exit through the openings 28 in the upper jacket member 10. The openings 30 in the lower jacket member 12 also provide for circulation of air into and out of the heater casing, so that there will be an adequate supply of air for contact with the arcuately shaped side wall of the water reservoir G. Experience with a practical embodiment of this invention shows that this apparatus will operate more efficiently if the reservoir G and its water supply is cooled by a natural circulation of air through the apparatus casing. It is, therefore, noted here that the reservoir G is so arranged in the casing that all of its walls are exposed to air circulating within the casing. This circulation of air is facilitated by the openings 30 which are arranged in the jacket member 12 and adjacent the arcuate side wall of the water reservoir G.

The safety valves 202 and 228 make the apparatus substantially safe for continued operation over long periods without the attention of an individual.

It will also now be apparent that the construction provided by this invention facilitates inspection or repair of the apparatus in the event this should be necessary. Inspection of this apparatus, in most cases, can be made without requiring more than removal of the upper casing portion or casing cover consisting of the top member 24 and the upper jacket member 10. Access to the fuel supply control C is secured by removal of the tray 22.

In other cases, inspection and repair may be facilitated by removal of the air heating and circulating assembly as a unit from the casing. This removal may be readily accomplished. The air heating and circulating assembly, in the preferred practice of this invention, is not secured in any way to the other parts of the apparatus and may be removed as a unit by merely lifting the same out of the jacket member 12.

The fuel supply and burner assembly unit may also be readily removed through the lower end of the jacket member 12, after removal of the base ring 16, which is detachably secured to the base of jacket member 12.

The apparatus of this invention, in its preferred form, is also characterized by the facility with which the individual parts may be assembled and removed. This facility is due in part to the use of detachable nut and bushing connections for the tubes of the illustrated apparatus. Several of these nut and bushing connections are identified by the numeral 306 in Figure 5.

Since the condenser H, boiler D, and turbine E are in a closed system, and the condensed steam is returned to the reservoir G, the necessity of replenishing the water is substantially minimized. However, when necessary, feed water may be introduced into the filling pipe 294 leading to the reservoir G.

It is also to be understood that, although this invention is particularly applicable to railroad refrigerator cars, it offers obvious advantages when practiced in connection with other types of railway and road vehicles including so-called ventilator cars, box cars, express cars, and motor trucks, as well as ships and in storage houses.

While it is preferable, because of its cheapness and convenience, to use water as the vaporizable fluid in the boiler of the heating apparatus herein described, it is obvious that other fluids, e. g. mercury or oil, may be substituted without substantial or material changes in the heater structure of this invention. In the event the heating apparatus is to be operated with water as the vaporizable fluid and is to be exposed to low temperatures, as for example during its storage, any suitable anti-freeze solution or preparation may be added to the water.

It will be understood that the foregoing description of the accompanying drawings is illustrative and that this invention includes all modifications and embodiments coming within the scope of the appended claims.

I claim:

1. A portable self-contained heating apparatus for use in merchandise chambers to maintain perishable commodities stored therein at a protective temperature, comprising a portable casing providing a housing and protecting enclosure for the remainder of the apparatus, said casing having inlet and outlet wall openings, a conduit extending from said inlet opening through the casing interior and to said outlet opening, heat exchange means arranged within said conduit, means for producing a forced draft of air through said conduit for contact with said heat exchange means, and means arranged exteriorly of said conduit and within said casing for supplying heating medium to said heat exchange means and for operating said draft producing means.

2. A portable self-contained heating apparatus for use in merchandise chambers to maintain perishable commodities stored therein at a protective temperature, comprising a portable casing providing a housing and protecting enclosure for the remainder of the apparatus, said casing having inlet and outlet wall openings, a conduit extending from said inlet opening through the casing interior and to said outlet opening, heat exchange and draft producing means arranged within said conduit, a boiler for supplying heated fluid to said heat exchange means, a reservoir to collect fluid from said heat exchange means and to supply fluid to said boiler, and a burner for heating said boiler, said reservoir, burner and boiler being arranged within said casing and exteriorly of said conduit, and said casing being apertured to provide a natural circulation of air through the heating apparatus for feeding air to said burner and for cooling said reservoir.

3. A portable self-contained heating apparatus for use in merchandise chambers to maintain perishable commodities stored therein at a protective temperature, comprising a casing, a conduit extending interiorly of said casing with one conduit end terminating at an opening in the casing top and the other conduit end terminating at an opening in the casing adjacent the base thereof, heat exchange means arranged within said conduit, means for producing a forced draft of air through said conduit for contact with said heat exchange means, means for operating said draft producing means, and means to produce steam for driving said operating means and heating said heat exchange means, said operating means and steam producing means being arranged within said casing and exteriorly of said conduit.

4. In a portable self-contained heating apparatus for use in merchandise chambers to maintain perishable commodities stored therein at a protective temperature, the combination comprising a casing having an apertured lower base portion and a removable cover having an opening therein, an air conduit mounted in said base portion with one conduit end extending to and registering with said cover opening, the other conduit end communicating with the aperture in said base portion, heat exchange means and mechanically operated draft producing means arranged within said conduit, and means arranged exteriorly of said conduit for supplying heating medium to said heat exchange means and driving said draft producing means.

5. In a portable self-contained heating apparatus for use in merchandise chambers to maintain perishable commodities stored therein at a protective temperature, the combination comprising a casing, a fluid fuel burner, a feed reservoir for said burner, said reservoir being so constructed and supported that at least a substantial part of its bottom and side wall surfaces is exposed for contact with air rising in the casing from below the reservoir, heat insulating means on the top of said reservoir, and a boiler mounted above said reservoir to be heated by said burner for generating steam to be used in the heating apparatus, said casing having apertures positioned at levels above and below said reservoir, whereby air enters the casing through the lower casing apertures, supplies the needs of said burner, as well as cools the bottom and side walls of said reservoir, and then leaves the casing by way of the upper apertures.

6. In a portable self-contained heating apparatus for use in merchandise chambers to maintain perishable commodities stored therein at a protective temperature, the combination comprising a casing having an apertured lower base portion and a removable cover, said cover providing an apertured top wall of the casing and the upper portion of the surrounding casing side wall, and an air conduit mounted in said base portion with one conduit end extending to and registering with said top wall aperture, the other end of said conduit communicating with the aperture in said base portion.

7. In a portable self-contained heating apparatus for use in merchandise chambers to maintain perishable commodities stored therein at a protective temperature, the combination comprising a casing having a lower base portion provided with apertures and a removable cover, said cover providing the casing top wall and the upper portion of the surrounding casing side wall, the said casing top wall having an opening therethrough and the said upper side wall portion being perforate, and an air conduit mounted in said base portion with one conduit end extending to and registering with said opening in the casing top wall, the other end of said conduit communicating with one of the apertures in said base portion.

8. In a portable self-contained heating apparatus for use in merchandise chambers to maintain perishable commodities stored therein at a protective temperature, the combination comprising a casing having a removable wall member, and a combined air heating and mechanically driven air circulating assembly mounted in said casing independently of said wall member and removable as a unit therefrom through the opening left upon removal of said wall member.

9. In a portable self-contained heating apparatus for use in merchandise chambers to maintain perishable commodities stored therein at a protective temperature, the combination comprising a fuel reservoir, burner and feed control assembly, and a casing having means providing a wall thereof and a support for said assembly, said means being separable from said assembly and detachable from the casing to uncover an opening in the latter, said opening permitting access to said assembly as well as removal thereof as a unit from the said casing.

10. In a portable self-contained heating apparatus for use in merchandise chambers to maintain perishable commodities stored therein at a protective temperature, the combination comprising a housing and two assemblies mounted in said housing, each of said assemblies being separately and readily removable as a unit from the said housing, one of said unit assemblies including a fuel burner, a reservoir for supplying fuel thereto, and a burner control device, the other of said unit assemblies including a boiler to be heated by said burner, draft producing means to circulate air through the apparatus, and means operated by the steam generated in said boiler for driving said draft producing means.

11. An apparatus as set forth in claim 10, in which the housing has removable top and bottom wall members, and the two assembly units are removable from opposite ends of the housing.

12. In a portable self-contained heating apparatus for use in merchandise chambers to maintain perishable commodities stored therein at a protective temperature, the combination comprising a housing, a boiler, a feed reservoir for said boiler, a conduit for air passing through said housing, a condenser in said conduit for condensing steam produced by said boiler and heating air in said conduit, mechanically operated means for circulating air through said conduit, and means operated by steam from said boiler for driving said mechanically operated means, said boiler, reservoir, conduit, condenser, and both said means being assembled into a unit and readily removable as such from the said housing.

13. An apparatus as defined in claim 12, in which bracket members on the inner side walls of the housing provide a rest for the reservoir and thereby support the unit in the installed position.

14. An apparatus as defined in claim 12, in which the housing has a removable portion to permit withdrawal of the unit assembly from the housing.

15. An apparatus as set forth in claim 12, in which the housing has an opening therein adjacent its base, a pipe is mounted in communication with said opening and slidably receives one end of the conduit when the unit is installed in the housing.

16. A unit for use in a portable casing of portable heating apparatus for the lading space of railway cars and the like, said unit comprising, in compact arrangement ready for installation in said portable casing, the combination of a conduit for air, mechanically operated means arranged in said conduit for circulating air therethrough, steam operated means for driving said mechanically operated means, heat exchange means arranged within said conduit to heat air being circulated therein by said air circulating means, and a boiler for supplying steam to said heat exchange means and said steam operated means, said boiler and said steam operated means being arranged exteriorly of said air conduit, said unit being completely assembled for operation and adapted to function in the intended manner upon application of heat to said boiler.

17. A unit as recited in claim 16, wherein the unit includes a reservoir adapted to feed said boiler and arranged exteriorly of the air conduit, a chamber for the steam operated means, a pipe connection for collecting condensed steam from said chamber and delivering it to said reservoir, and a separate pipe connection for collecting condensed steam from the heat exchange means and delivering it to said fuel reservoir.

18. A unit for use in portable heating apparatus, said unit comprising in compact arrangement ready for installation in the housing of said apparatus the combination of a boiler, a feed reservoir for said boiler, an air conduit, heat exchange means arranged within said conduit and adapted to be supplied with steam produced in said boiler, means for producing a forced draft of air through said conduit for contact with said heat exchange means, and means driven by steam produced in said boiler for operating said draft producing means, said unit being completely assembled for operation and adapted to function in the intended manner upon application of heat to said boiler.

19. In a portable self-contained heating apparatus for use in merchandise chambers to maintain perishable commodities stored therein at a protective temperature, the combination comprising a housing having top and side wall members, a removable fuel reservoir, burner and regulator assembly, means providing a seat for said assembly and detachably secured to the housing side wall member for removal through the bottom of said housing, and a tray providing the bottom wall of said housing and readily removable therefrom to permit access to said assembly, said assembly being removable through the lower end of said housing when said seat and tray are detached therefrom.

20. In a portable self-contained heating apparatus for use in merchandise chambers to maintain perishable commodities stored therein at a protective temperature, the combination comprising a casing having an apertured lower base portion and a removable apertured cover, and an air conduit mounted in said base portion with one conduit end extending to and registering with said cover aperture, the other end of said conduit communicating with the aperture in said base portion.

21. A unit for installation within a protecting housing of portable heating apparatus, said unit comprising in compact arrangement ready for installation in said housing the combination of a boiler, a feed reservoir for said boiler, an air conduit, a condenser coil arranged within said conduit and in the path of air passing therethrough, said condenser coil being adapted to be supplied with steam produced in said boiler and to discharge its condensate into said reservoir, mechanically operated means mounted within said conduit and between said condenser coil and the outlet of said conduit for drawing air into said conduit for heat exchange contact with said condenser coil, and means driven by steam produced in said boiler for operating said draft producing means, said unit being completely assembled for operation and adapted to function in the intended manner upon applicatiton of heat to said boiler.

22. In a portable self-contained heating apparatus for use in merchandise chambers to maintain perishable commodities stored therein at a protective temperature, the combination comprising a housing having top and side wall members; a removable fuel reservoir, burner and regulator assembly, said regulator being arranged below said reservoir; means secured to said housing side wall member and providing a support for said assembly; and a tray providing the bottom wall of said housing and readily removable therefrom to permit access to said regulator without removal of said assembly from said housing.

23. In a portable self-contained heating apparatus for use in merchandise chambers to maintain perishable commodities stored therein at a protective temperature, a closed fluid system comprising a boiler, a feed reservoir for said boiler, said reservoir being arranged at a level above said boiler to provide a gravity feed thereto, a feed line connecting said reservoir and boiler, valve means arranged in said feed line and responsive to variation in both the liquid level and the steam pressure of said boiler, a chamber communicating with said boiler to receive steam therefrom and having means driven by said steam, means providing separate outlets for the steam and condensate collected in said chamber, means for feeding said condensate from said condensate outlet to said reservoir, a condenser, means for feeding steam from said steam outlet to said condenser, and means for feeding the discharge of said condenser to said reservoir, said chamber and said condenser being arranged at higher elevation than said reservoir to provide gravity feed of condensate thereto.

24. In a portable self-contained heating apparatus for use in merchandise chambers to maintain perishable commodities stored therein at a protective temperature, a closed fluid system comprising a boiler, a feed reservoir for said boiler, a chamber communicating with said boiler to receive steam therefrom, means arranged in said chamber and adapted to be driven by said steam, means providing separate outlets for the steam and condensate collected in said chamber, means for feeding said condensate from said condensate outlet to said reservoir, a condenser, means for feeding steam from said steam outlet to said condenser, means for feeding the discharge of said condenser to said reservoir, and mechanically operated means adapted to be driven by said steam driven means and to produce a forced draft of air for heat exchange contact with said condenser.

EDWARD A. SWEELEY.